US009559343B2

(12) United States Patent
Yun

(10) Patent No.: US 9,559,343 B2
(45) Date of Patent: Jan. 31, 2017

(54) RECHARGEABLE BATTERY

(71) Applicant: SAMSUNG SDI CO., LTD., Yongin-si, Gyeonggi-do (KR)

(72) Inventor: Ji-Won Yun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 145 days.

(21) Appl. No.: 14/187,112

(22) Filed: Feb. 21, 2014

(65) Prior Publication Data
US 2015/0050547 A1 Feb. 19, 2015

(30) Foreign Application Priority Data

Aug. 13, 2013 (KR) ........................ 10-2013-0096162

(51) Int. Cl.
H01M 2/04 (2006.01)
H01M 2/20 (2006.01)
H01M 2/30 (2006.01)
H01M 2/32 (2006.01)

(52) U.S. Cl.
CPC .......... H01M 2/0473 (2013.01); H01M 2/043 (2013.01); H01M 2/202 (2013.01); H01M 2/206 (2013.01); H01M 2/305 (2013.01); H01M 2/32 (2013.01)

(58) Field of Classification Search
CPC .... H01M 2/0473; H01M 2/202; H01M 2/043; H01M 2/206; H01M 2/305; H01M 2/32
See application file for complete search history.

(56) References Cited

U.S. PATENT DOCUMENTS

| 2009/0081538 A1* | 3/2009 | Moon ........................... 429/178 |
| 2009/0214937 A1 | 8/2009 | Bauer et al. |
| 2010/0086845 A1* | 4/2010 | Jung et al. .................... 429/178 |
| 2011/0070466 A1* | 3/2011 | Park et al. ........................ 429/7 |
| 2011/0117391 A1 | 5/2011 | Baek et al. |

FOREIGN PATENT DOCUMENTS

| KR | 10-2007-0092696 | 9/2007 |
| KR | 10-2011-0054310 | 5/2011 |

* cited by examiner

Primary Examiner — Jeremiah Smith
(74) Attorney, Agent, or Firm — Lewis Roca Rothgerber Christie LLP

(57) ABSTRACT

A rechargeable battery including an electrode assembly, a case configured to receive the electrode assembly, a cap plate configured to be coupled to an opening of the case and comprising a fixing groove, and an insulation case between the cap plate and the electrode assembly and including a fixing protrusion configured to be inserted into the fixing groove.

9 Claims, 7 Drawing Sheets

RECHARGEABLE BATTERY

CROSS-REFERENCE TO RELATED APPLICATION

This application claims priority to and the benefit of Korean Patent Application No. 10-2013-0096162, filed in the Korean Intellectual Property Office, on Aug. 13, 2013, the entire content of which is incorporated herein by reference.

BACKGROUND

1. Field

The described technology relates generally to a rechargeable battery. Particularly, the described technology relates to a rechargeable battery including a cap plate and an insulation case with an improved combination structure.

2. Description of the Related Art

The rechargeable battery repeatedly performs charging and discharging, unlike the primary battery. A low-capacity rechargeable battery is used in small and portable electronic devices, such as a mobile phone, a laptop computer, and a camcorder; and a high-capacity rechargeable battery is used as a power source for driving a motor in an electric bicycle, a scooter, an electric vehicle, and a fork lift.

A rechargeable battery includes an electrode assembly formed by spirally winding a positive electrode and a negative electrode stacked with a separator interposed therebetween in a jellyroll form, a case configured to receive the electrode assembly and an electrolyte solution, a cap plate configured to seal an opening at the top of the case, an electrode terminal installed in the cap plate and electrically coupled to the electrode assembly, and an insulation case located between the electrode assembly and the cap plate.

Further, the electrode assembly includes a positive lead tab connected to the positive electrode and a negative lead tab connected to the negative electrode.

The positive lead tab and the negative lead tab of the electrode assembly are passed through the insulation case and are coupled to the cap plate and the electrode terminal, respectively. Further, a space between the electrode terminal and the cap plate is insulated with an insulation member.

Therefore, a space for installing the positive lead tab, the negative lead tab, the electrode terminal, and the insulation member is needed between the cap plate and the insulation case.

Further, the electrolyte solution is supplied to the case through an electrolyte injection opening that is formed in the cap plate for sealing the opening of the case.

In this instance, the electrolyte solution is passed through the space in which the positive lead tab, the negative lead tab, the electrode terminal, and the insulation member are installed between the cap plate and the insulation case. The electrolyte solution is further passed through the electrolyte solution hole in which the insulation case is formed, and is then supplied inside the case in which the electrode assembly is installed.

Therefore, a time for supplying the electrolyte solution to the electrode assembly may be prolonged and the electrode assembly may be insufficiently impregnated by the electrolyte solution.

Also, as the space in which the positive lead tab, the negative lead tab, the electrode terminal, and the insulation member are installed becomes larger, the size of the electrode assembly is reduced, thereby restricting the capacity of the rechargeable battery.

The above information is only for enhancement of understanding of the background of the described technology and therefore it may contain information that does not form the prior art that is already known in this country to a person of ordinary skill in the art.

SUMMARY

Aspects of the present invention are directed to a cap plate and an insulation case having a combination configuration for reducing (e.g., minimizing) a space between the cap plate and the insulation case.

According to an aspect of the present invention, there is provided a rechargeable battery including: an electrode assembly; a case configured to receive the electrode assembly; a cap plate configured to be coupled to an opening of the case and including a fixing groove; and an insulation case between the cap plate and the electrode assembly and including a fixing protrusion configured to be inserted into the fixing groove.

The fixing groove may be formed through the cap plate.

The fixing groove may include a first fixing groove and a second fixing groove at a distance from and in parallel with the first fixing groove, and wherein the fixing protrusion includes a first fixing protrusion configured to be inserted into the first fixing groove and a second fixing protrusion at a distance from and in parallel with the first fixing protrusion and configured to be inserted into the second fixing groove.

The fixing groove may further include a third fixing groove perpendicular to the first fixing groove and the second fixing groove, and a fourth fixing groove at a distance from and in parallel with the third fixing groove, and wherein the fixing protrusion further includes a third fixing protrusion configured to be inserted into the third fixing groove, and a fourth fixing protrusion at a distance from and in parallel with the third fixing protrusion and configured to be inserted into the fourth fixing groove.

The cap plate may further include a rotation-preventing groove formed with a gap from the fixing groove, and wherein the insulation case may further include a rotation-preventing protrusion configured to be coupled to the rotation-preventing groove.

The rotation-preventing groove may include a first rotation-preventing groove and a second rotation-preventing groove at a distance from the first rotation-preventing groove, and wherein the rotation-preventing protrusion may include a first rotation-preventing protrusion configured to be coupled to the first rotation-preventing groove and a second rotation-preventing protrusion configured to be coupled to the second rotation-preventing groove.

The insulation case may be configured with a fixing protrusion and a plate-shape body at which the fixing protrusion is protruded and which contacts the electrode assembly.

A length of the body of the insulation case may be greater than a length of one side of the electrode assembly.

A height of the fixing protrusion may be 1.1 times a thickness of the cap plate.

Illustrative

According to an embodiment, the space between the cap plate and the insulation case is reduced (e.g., minimized) to effectively supply (e.g., inject) the electrolyte solution into the case, and the size of the electrode assembly inserted into the case is increased to increase the capacity of the rechargeable battery.

DETAILED DESCRIPTION

Figure 1:
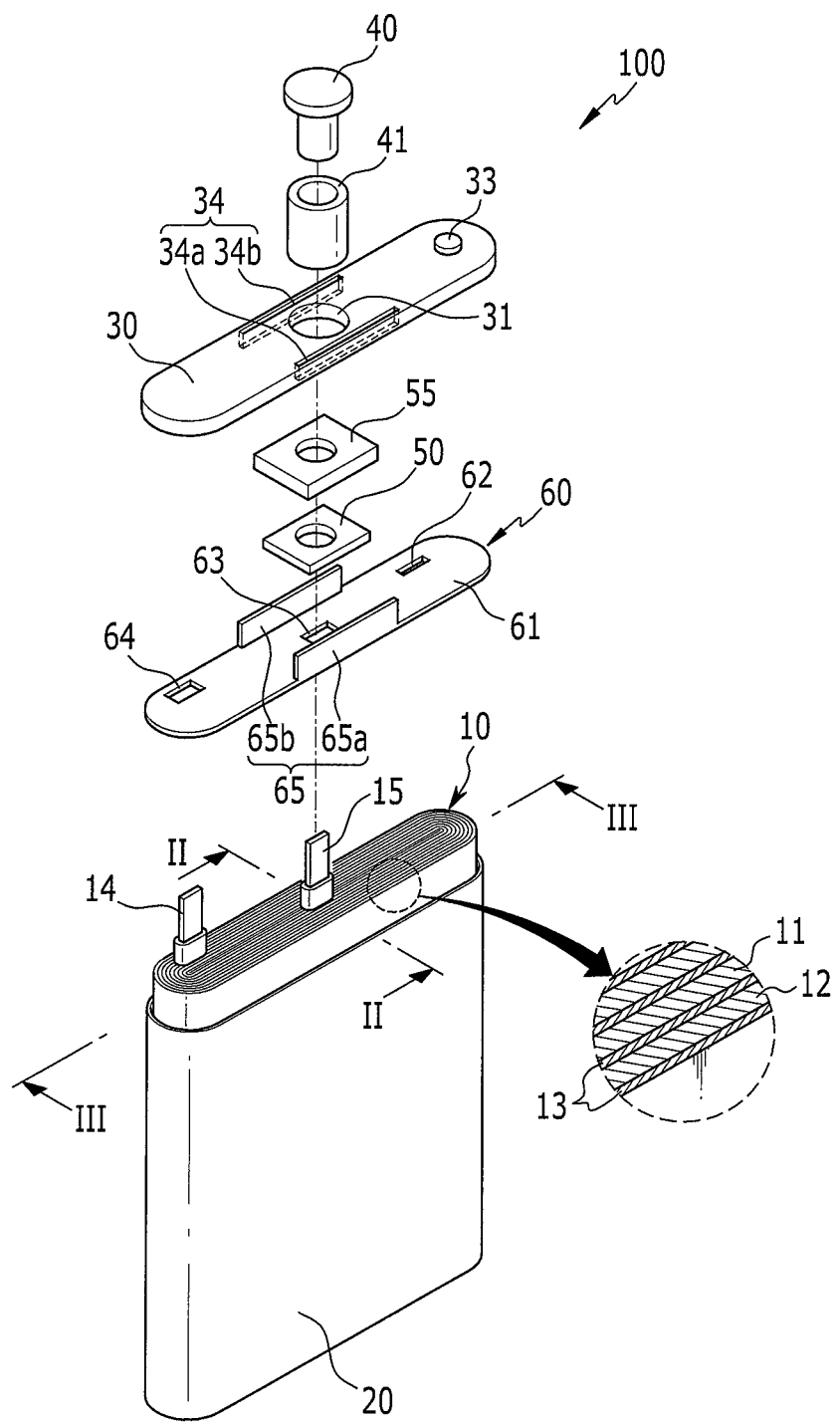
FIG. 1 shows an exploded perspective view of a rechargeable battery in accordance with a first illustrative embodiment of the present invention.

The present invention will be described more fully hereinafter with reference to the accompanying drawings, in which illustrative embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
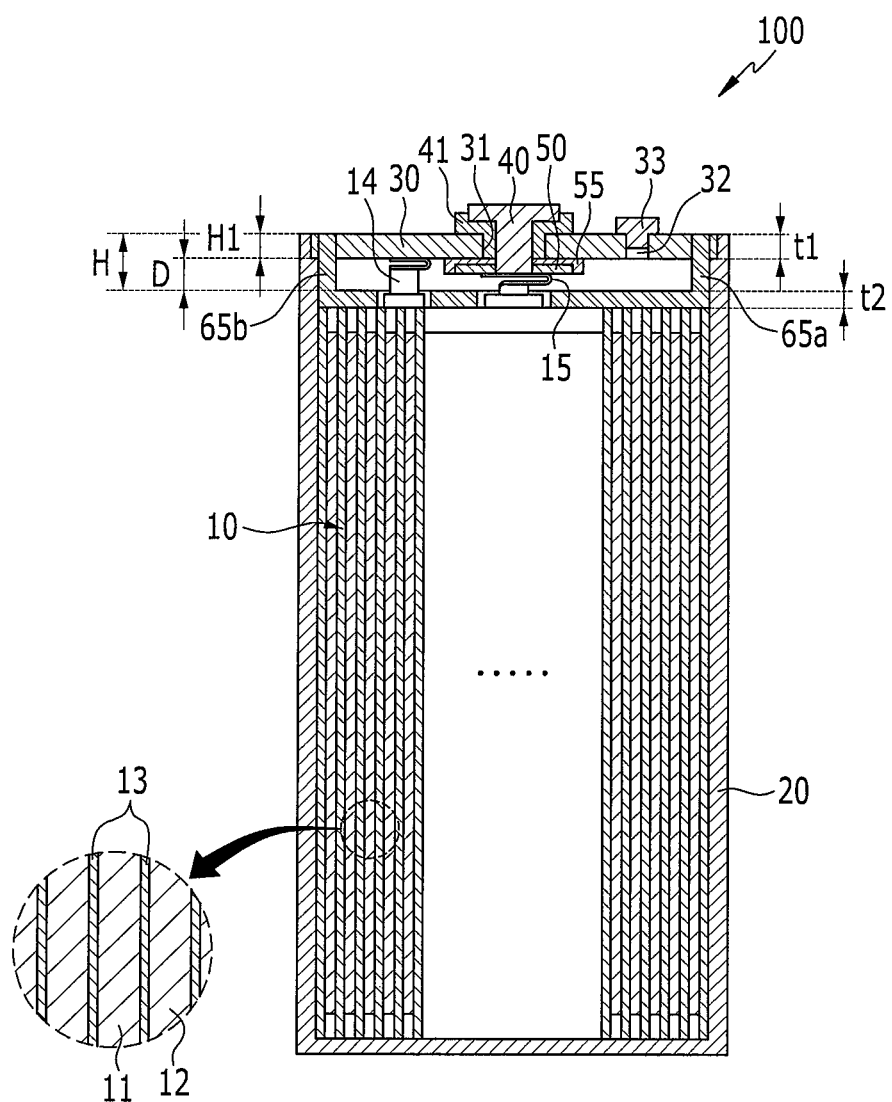
FIG. 2 shows a cross-sectional view taken along the line II-II of FIG. 1 in accordance with an illustrative embodiment of the present invention.
Figure 3:
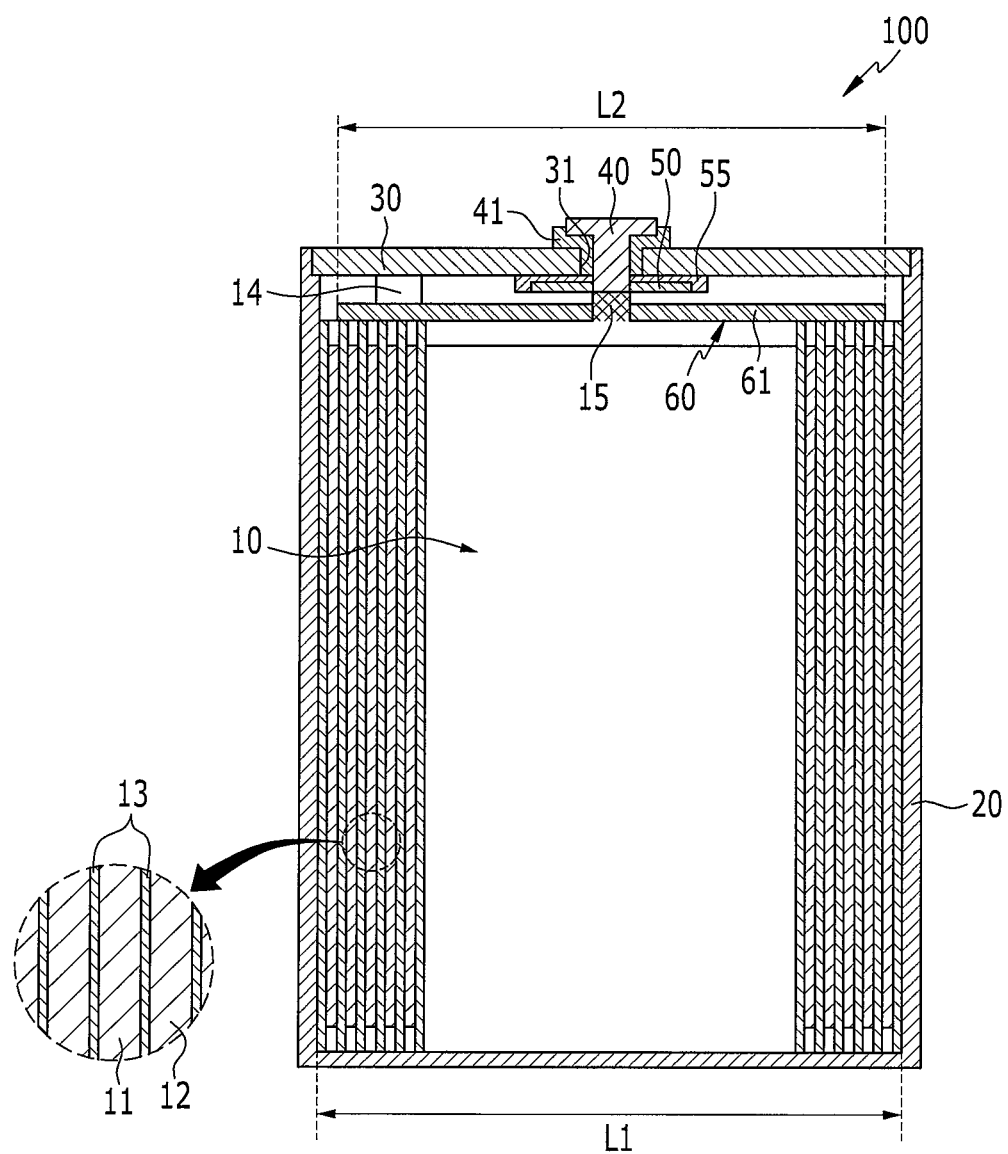
FIG. 3 shows a cross-sectional view taken along the line III-III of FIG. 1 in accordance with an illustrative embodiment of the present invention.

FIG. 1 shows an exploded perspective view of a rechargeable battery in accordance with a first illustrative embodiment of the present invention, and FIG. 2 shows a cross-sectional view taken along the line II-II of FIG. 1, according to an embodiment of the present invention.

Referring to FIG. 1 and FIG. 2, the rechargeable battery 100 includes an electrode assembly 10, a case 20 configured to have the electrode assembly embedded therein, a cap plate 30 coupled to (e.g., attached to or combined with) the opening of the case 20, an electrode terminal 40 installed in the cap plate 30, a terminal plate 50 coupled to the electrode terminal 40, and an insulation case 60 positioned between the cap plate 30 and the electrode assembly 10.

The electrode assembly 10 in accordance with the present illustrative embodiment is formed by stacking a positive electrode 11 and a negative electrode 12 on respective surfaces of a separator 13 that is an electrical insulator, and spirally winding the positive electrode 11 and the negative electrode 12 in a jellyroll form.

Furthermore, the electrode assembly 10 includes a positive lead tab 14 coupled to (e.g., connected to) the positive electrode 11 and a negative lead tab 15 coupled to the negative electrode 12.

The positive lead tab 14 may be coupled to the bottom of the cap plate 30 that faces the electrode assembly 10 by way of welding.

The case 20 for receiving the electrode assembly 10 may be made of, for example, a conductive material including aluminum, an aluminum alloy, and/or the like.

Accordingly, the case 20 is electrically coupled to the positive electrode 11 of the electrode assembly 10 via the cap plate 30, thus functioning as a positive terminal.

The electrode terminal 40 is fixed to a terminal hole 31 formed in the cap plate 30.

An insulation gasket 41 located between the terminal hole 31 and the electrode terminal 40 electrically insulates and seals the terminal hole 31 and the electrode terminal 40.

Furthermore, the terminal plate 50 is coupled to (e.g., combined with) one end of the electrode terminal 40 that faces the electrode assembly 10, and an insulation plate 55 is located between the terminal plate 50 and the cap plate 30.

Accordingly, the cap plate 30 and the terminal plate 50 are electrically insulated from one another by the insulation plate 55, and the insulation plate 55 seals the cap plate 30 and the terminal plate 50.

The negative lead tab 15 in accordance with the present illustrative embodiment is coupled to (e.g., connected to) the bottom of the terminal plate 50, and is combined with (e.g., inserted into) one end of the electrode terminal 40 that faces the electrode assembly 10 by way of welding.

Accordingly, the electrode terminal 40 provided in the terminal hole 31 of the cap plate 30 is electrically coupled to the negative electrode 12 of the electrode assembly 10, thus functioning as a negative terminal.

An electrolyte injection opening 32 is formed in the cap plate 30, and the electrolyte solution is injected inside the case 20 through the electrolyte injection opening 32.

The electrolyte injection opening 32 is sealed with a sealing plug 33 when the electrolyte solution is supplied.

The insulation case 60 is located between the electrode assembly 10 and the terminal plate 50 and is configured to electrically insulate the electrode assembly 10 and the terminal plate 50.

The insulation case 60 includes a body 61, an electrolyte solution hole 62 configured to allow an electrolyte solution to pass therethrough, and first and second tab holes 63 and 64 configured to allow the positive lead tab 14 and the negative lead tab 15 to pass (or penetrate) therethrough.

Therefore, the positive lead tab 14 is coupled to the cap plate 30 through the first tab hole 63, and the negative lead tab 15 is coupled to the terminal plate 50 through the second tab hole 64.

Further, a fixing protrusion 65, which is inserted into a fixing groove 34 formed in the cap plate 30, is formed on the insulation case 60.

The fixing groove 34 may be formed through the cap plate 30.

The fixing groove 34 includes a first fixing groove 34a and a second fixing groove 34b formed in parallel with the first fixing groove 34a with a gap (or distance) therebetween.

For example, the first fixing groove 34a and the second fixing groove 34b may be formed in parallel with each other with the terminal hole 31 formed in the cap plate 30 therebetween.

However, formation positions of the first fixing groove 34a and the second fixing groove 34b are not limited with regard to the terminal hole 31, and they may be formed in another part of the cap plate 30 where the terminal hole 31 is not formed.

Further, the fixing protrusion 65 includes a first fixing protrusion 65a inserted into the first fixing groove 34a and a second fixing protrusion 65b inserted into the second fixing groove 34b.

Therefore, the first fixing protrusion 65a and the second fixing protrusion 65b are protruded from a part of the insulation case 60 that corresponds to the formed positions of the first fixing groove 34a and the second fixing groove 34b, and they are formed in parallel with each other with a gap (or distance) therebetween.

The insulation case 60 includes the body 61 having a thickness and a plate shape, and the first fixing protrusion 64a and the second fixing protrusion 64b, which protrude from the body 61.

In one embodiment, no features (or configurations) other than the fixing protrusion 65 are formed on the body 61 of the insulation case 60.

The body 61 of the insulation case 60 is installed to contact one side of the electrode assembly 10 facing the cap plate 30, and the first fixing protrusion 65a and the second fixing protrusion 65b are inserted into the first fixing groove 34a and the second fixing groove 34b, respectively.

In an embodiment, a length (L2) of the body 61 of the insulation case 60 contacting one side of the electrode assembly 10 is less than a length (L1) of the one side of the electrode assembly 10, which the body 61 contacts.

When the first fixing protrusion 65a and the second fixing protrusion 65b are not inserted into the first fixing groove 34a and the second fixing groove 34b, a distance (D) between the cap plate 30 and the body 61 of the insulation case 60 may be equal to or greater than a height (H) of the first fixing protrusion 65a and the second fixing protrusion 65b.

However, when the first fixing protrusion 65a and the second fixing protrusion 65b are inserted into the first fixing groove 34a and the second fixing groove 34b, a length, which is determined by subtracting the height (H1) of the first fixing protrusion 65a and the second fixing protrusion 65b that are inserted into the first fixing groove 34a and the second fixing groove 34b from the height (H) of the first fixing protrusion 65a and the second fixing protrusion 65b, becomes the distance (D) between the cap plate 30 and the body 61 of the insulation case 60.

Therefore, the insulation case 60 may be installed so that the distance (D) between the cap plate 30 and the body 61 of the insulation case 60 may approach the height (H1) of the first fixing protrusion 65a and the second fixing protrusion 65b that are inserted into the first fixing groove 34a and the second fixing groove 34b of the cap plate 30.

For example, in one embodiment, each height (H) of the first fixing protrusion 65a and the second fixing protrusion may is 1.1 times the thickness (t1) of the cap plate 30.

When the height (H1) of the first fixing protrusion 65a and the second fixing protrusion 65b that are inserted into the first fixing groove 34a and the second fixing groove 34b corresponds to the thickness (t1) of the cap plate 30, the distance (D) between the cap plate 30 and the body 61 of the insulation case 60 becomes 0.1 times the thickness (t1) of the cap plate 30.

Resultantly, because a reduced space (e.g., the minimum space) for installing the electrode terminal 40, the positive lead tab 14, and the negative lead tab 15 may be provided between the cap plate 30 and the insulation case 60, the space between the cap plate 30 and the insulation case 60 is reduced (e.g., minimized).

As described, when the distance (D) between the cap plate 30 and the body 61 of the insulation case 60 becomes small, an inner space of the case 20 for receiving the electrode assembly 10 becomes greater so it is possible to receive an electrode assembly 10 having an increased charge and discharge capacity caused by an increase in size into the case 20.

Therefore, according to an illustrative embodiment of the present invention, the rechargeable battery with an increased charge and discharge capacity is provided.

Further, because the distance (D) between the cap plate 30 and the body 61 of the insulation case 60 becomes small, the length (L2) of the body 61 of the insulation case 60 becomes less than the length (L1) of one side of the electrode assembly 10, which the body 61 contacts, and the time for the electrolyte solution to remain in the body 61 of the insulation case 60 is reduced, the electrolyte solution is quickly injected into the case 20 through the electrolyte injection opening 32 formed in the cap plate 30, and the electrode assembly 10 is efficiently (e.g., quickly and completely) impregnated with the electrolyte solution.

Figure 4:
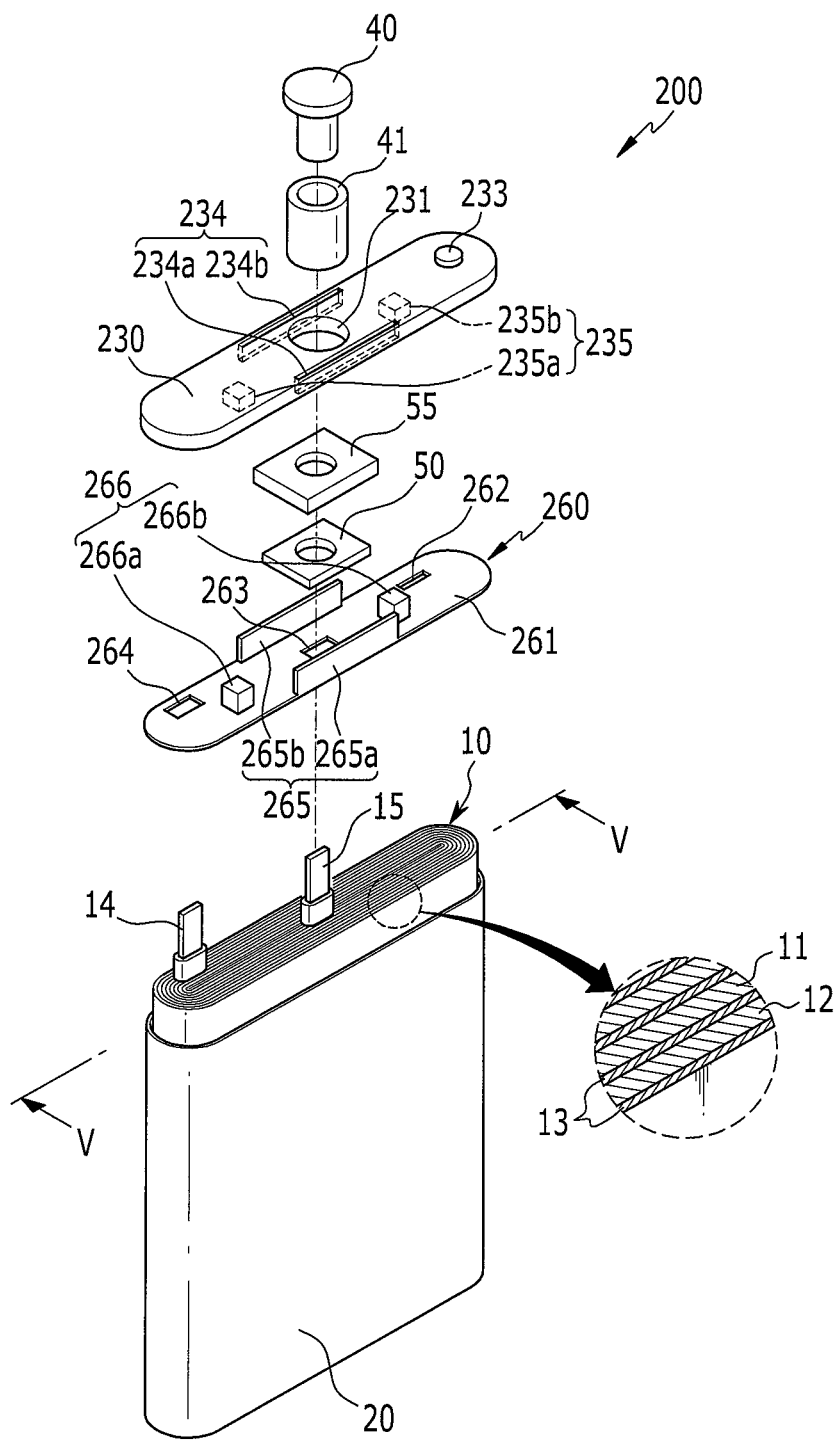
FIG. 4 shows an exploded perspective view of a rechargeable battery in accordance with a second illustrative embodiment of the present invention.
Figure 5:
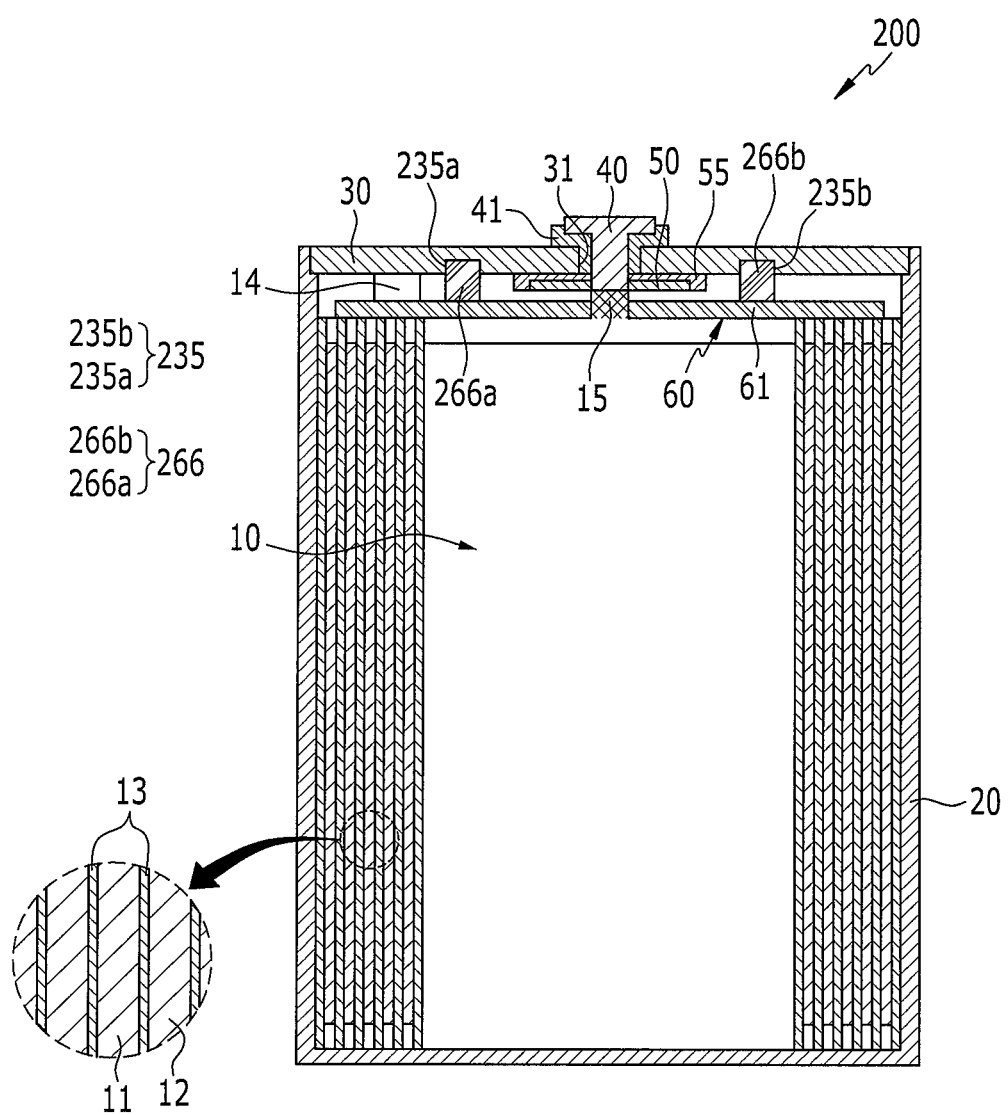
FIG. 5 shows a cross-sectional view taken along the line V-V of FIG. 4 in accordance with an illustrative embodiment of the present invention.

FIG. 4 shows an exploded perspective view of a rechargeable battery in accordance with a second illustrative embodiment of the present invention, and FIG. 5 shows a cross-sectional view taken along line V-V of FIG. 4, according to an embodiment of the present invention.

Referring to FIG. 4 and FIG. 5, the rechargeable battery 200 has substantially the same configuration as the rechargeable battery 100 according to the first illustrative embodiment of the present invention, except for a cap plate 230 and an insulation case 260.

Therefore, a detailed description of the same construction as that of the rechargeable battery 100 in accordance with the first illustrative embodiment of the present invention is not repeated hereinafter.

The cap plate 230 includes a terminal hole 231 to which the electrode terminal 40 is coupled (e.g., combined), an electrolyte injection opening 232 into which the electrolyte solution is injected, a sealing plug 233 for sealing the electrolyte injection opening 232, a fixing groove 234 having a first fixing groove 234a and a second fixing groove 234b, and a rotation-preventing groove 235.

The cap plate 230 according to the present illustrative embodiment has substantially the same configuration as the cap plate 30 of the rechargeable battery 100 according to the first illustrative embodiment of the present invention, except for the rotation-preventing groove 235. As such, a detailed description of the same configurations will not be provided.

In addition, the insulation case 260 includes a body 261, an electrolyte solution hole 262 through which the electrolyte solution passes, first and second tab holes 263 and 264 through which the positive lead tab 14 and the negative lead tab 15 pass, respectively, a fixing protrusion 265 including a first fixing protrusion 265a and a second fixing protrusion 265b, and a rotation-preventing protrusion 266.

In this instance, the insulation case 260 according to the present illustrative embodiment has substantially the same configuration as the insulation case 60 of the rechargeable battery 100 according to the first illustrative embodiment of the present invention, except for the rotation-preventing protrusion 266. As such, a detailed description of the same configurations will not be provided.

The rotation-preventing groove 235 according to the present illustrative embodiment is formed on one side of the cap plate 230 facing the electrode assembly 10 with a gap (or distance) between the rotation-preventing groove 235 and the fixing groove 234.

Further, the rotation-preventing groove 235 includes a first rotation-preventing groove 235a and a second rotation-preventing groove 235b separately formed from the first and second fixing grooves 234a and 234b with a gap (or distance) therebetween.

Furthermore, the rotation-preventing protrusion 266 includes a first rotation-preventing protrusion 266a coupled to (e.g., combined to) the first rotation-preventing groove 235a, and a second rotation-preventing protrusion 266b coupled to the second rotation-preventing groove 235b.

Therefore, the first rotation-preventing protrusion 266a and the second rotation-preventing protrusion 266b formed on the insulation case 260 may be coupled to the first rotation-preventing groove 235a and the second rotation-preventing groove 235b formed in the cap plate 230, so as to allow the insulation case 260 to be firmly fixed to the cap plate 230 (e.g., rotation of the cap plate 230 with respect to the insulation case 260 may be prevented).

Figure 6:
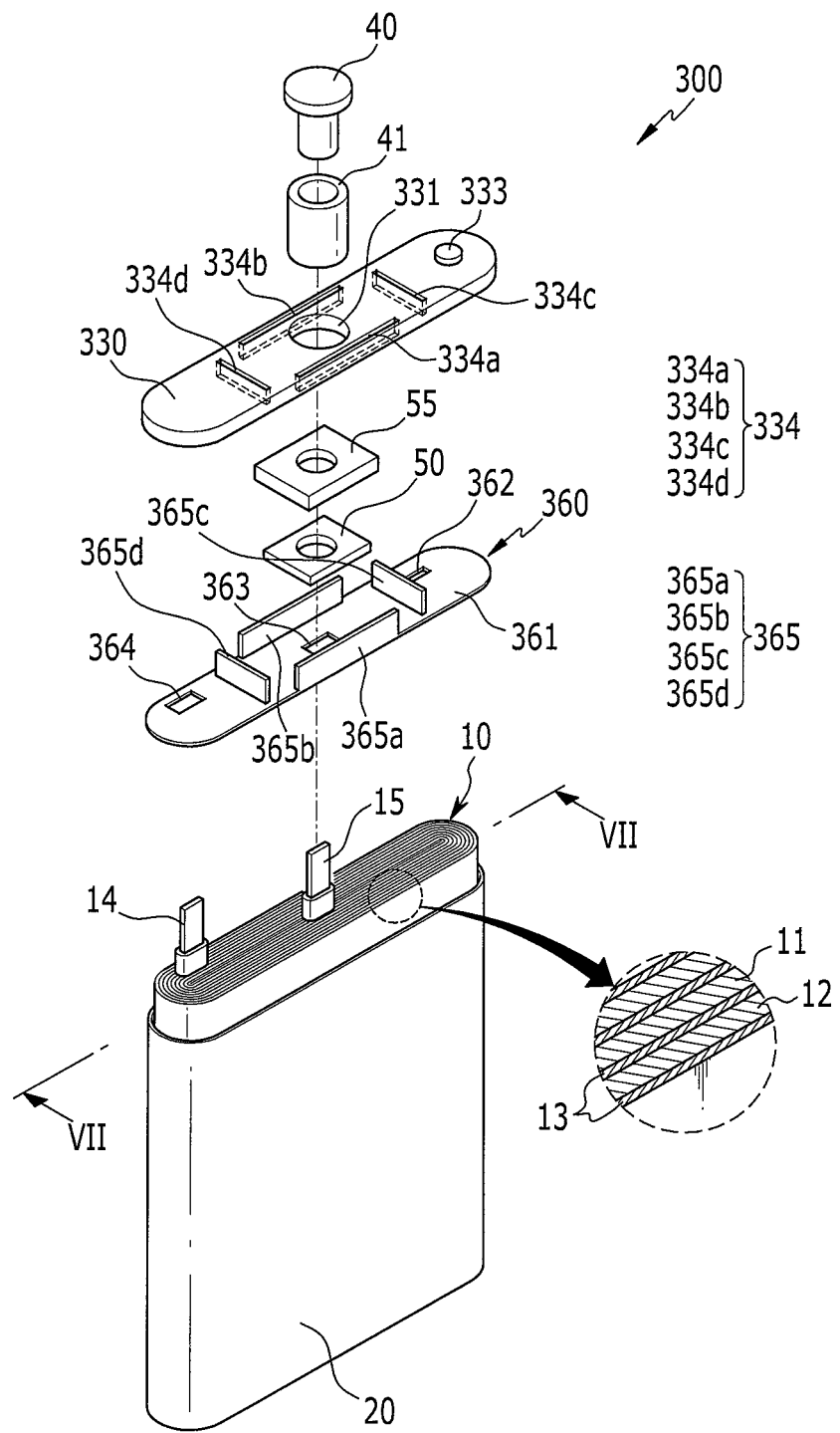
FIG. 6 shows an exploded perspective view of a rechargeable battery in accordance with a third illustrative embodiment of the present invention.
Figure 7:
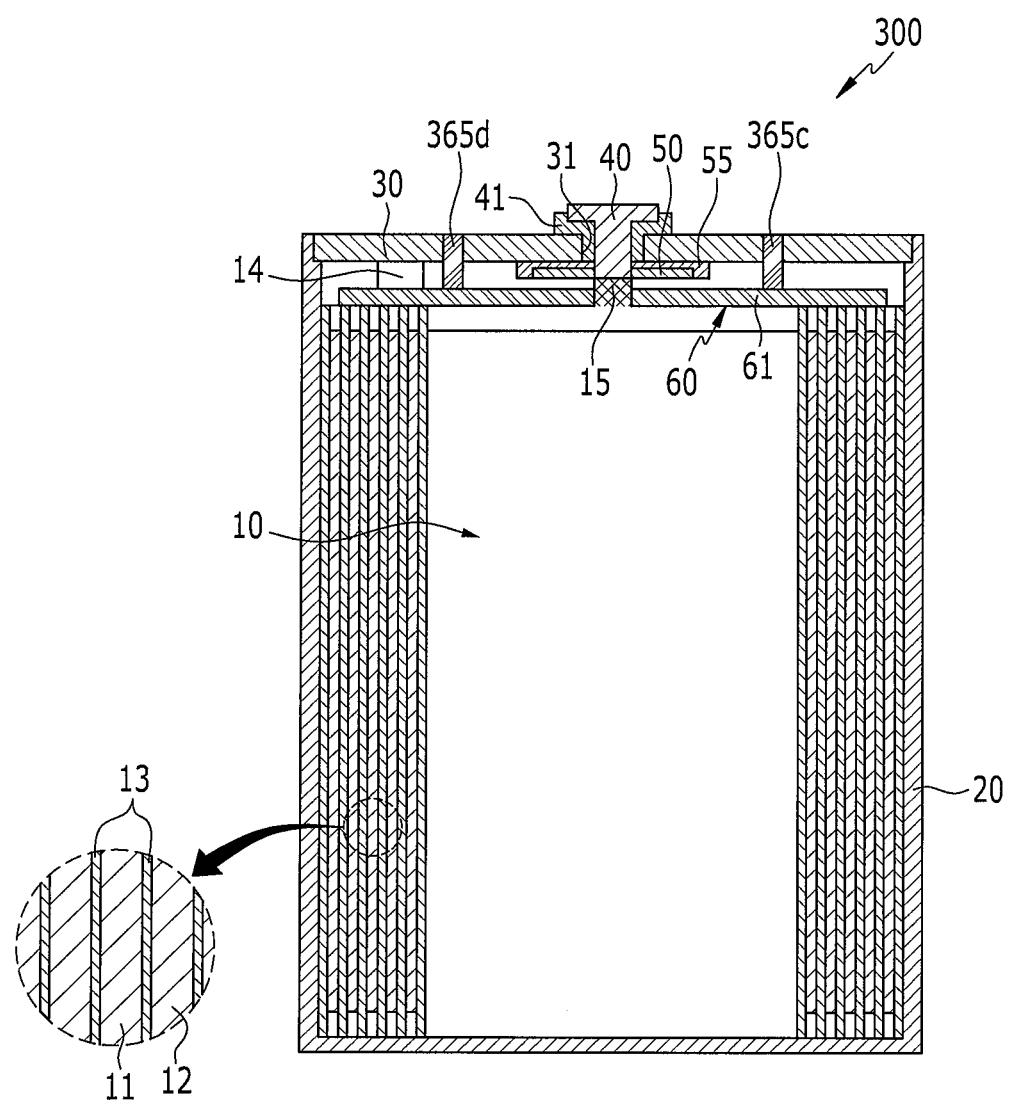
FIG. 7 shows a cross-sectional view taken along the line VII-VII of FIG. 6 in accordance with an illustrative embodiment of the present invention.

FIG. 6 shows an exploded perspective view of a rechargeable battery in accordance with a third illustrative embodiment of the present invention, and FIG. 7 shows a cross-sectional view taken along a line VII-VII of FIG. 6.

Referring to FIG. 6 and FIG. 7, the rechargeable battery 300 has substantially the same configuration as the rechargeable battery 100 according to the first illustrative embodiment of the present invention, with the exception of a cap plate 330 and an insulation case 360.

Therefore, a detailed description of the same construction as that of the rechargeable battery 100 in accordance with the first illustrative embodiment of the present invention is not repeated hereinafter.

The cap plate 330 includes a terminal hole 331 to which the electrode terminal 40 is coupled (e.g., combined), an electrolyte injection opening 332 through which the electrolyte solution is injected, a sealing plug 333 for sealing the electrolyte injection opening 332, and a fixing groove 334.

In an embodiment, the cap plate 330 according to the present illustrative embodiment has substantially the same configuration as the cap plate 30 of the rechargeable battery 100 according to the first illustrative embodiment of the present invention, with the exception of the fixing groove 334. As such, a detailed description of the same configurations will not be provided.

The insulation case 360 includes a body 361, an electrolyte solution hole 362 through which the electrolyte solution passes, first and second tab holes 363 and 364 through which the positive lead tab 14 and the negative lead tab 15 pass, and a fixing protrusion 365.

The insulation case 360 according to the present illustrative embodiment has substantially the same configuration as the insulation case 60 of the rechargeable battery 100 according to the first illustrative embodiment of the present invention, except for the fixing protrusion 365. As such, a detailed description of the same configurations will not be provided.

The fixing groove 334 includes a first fixing groove 334a, a second fixing groove 334b, a third fixing groove 334c, and a fourth fixing groove 334d.

The fixing groove 334 is formed through the cap plate 330.

Further, the first fixing groove 334a and the second fixing groove 334b are formed in parallel with a gap (or distance) therebetween.

For example, the first fixing groove 334a and the second fixing groove 334b may be formed in parallel with the terminal hole 331 formed in the cap plate 330 therebetween.

However, formation positions of the first fixing groove 334a and the second fixing groove 334b are not restricted to surrounding the terminal hole 331, and they may be formed in another part of the cap plate 330 where the terminal hole 331 is not formed.

Further, the third fixing groove 334c is formed to be perpendicular to the first fixing groove 334a and the second fixing groove 334b, and the fourth fixing groove 334d is separately formed from (i.e., at a distance from) the third fixing groove 334c with the first fixing groove 334a and second fixing groove 334b therebetween.

Therefore, the first fixing groove 334a to the fourth fixing groove 334d may be formed to surround the terminal hole 331.

The insulation case 360 is configured with the body 361 that has a thickness and a plate shape, and the fixing protrusion 365.

That is, no configurations other than the fixing protrusion 365 are formed on the body 361 of the insulation case 60.

Further, the fixing protrusion 365 includes a first fixing protrusion 365a, a second fixing protrusion 365b, a third fixing protrusion 365c, and a fourth fixing protrusion 365d.

The body 361 of the insulation case 360 is installed to contact one side of the electrode assembly 10 facing the cap plate 330, and the first fixing protrusion 365a to the fourth fixing protrusion 365d are inserted into the first fixing groove 334a to the fourth fixing groove 334d, respectively.

Accordingly, according to the present illustrative embodiment, the first fixing protrusion 365a to the fourth fixing protrusion 365d are inserted into the first fixing groove 334a to the fourth fixing groove 334d surrounding the terminal hole 331 so rotation of the insulation case 360 is prevented and the insulation case 360 is firmly fixed into the case 20.

While this invention has been described in connection with what is presently considered to be practical illustrative embodiments, it is to be understood that the invention is not limited to the disclosed embodiments, but, on the contrary, is intended to cover various modifications and equivalent arrangements included within the spirit and scope of the appended claims and equivalents thereof.

What is claimed is:

1. A rechargeable battery comprising:
   an electrode assembly;
   a case configured to receive the electrode assembly;
   a cap plate configured to be coupled to an opening of the case and comprising a fixing groove; and
   an insulation case between the cap plate and the electrode assembly and comprising a fixing protrusion configured to be inserted into the fixing groove, the fixing protrusion extending from a top surface of the insulation case and having a height greater than a thickness of the cap plate at an edge of the cap plate, the fixing protrusion having a uniform thickness along the height of the fixing protrusion and being flush with a top surface of the cap plate.

2. The rechargeable battery of claim 1, wherein the fixing groove is formed through the cap plate.

3. The rechargeable battery of claim 2,
   wherein the fixing groove comprises a first fixing groove and a second fixing groove at a distance from and in parallel with the first fixing groove, and
   wherein the fixing protrusion comprises a first fixing protrusion configured to be inserted into the first fixing groove and a second fixing protrusion at a distance from and in parallel with the first fixing protrusion and configured to be inserted into the second fixing groove.

4. The rechargeable battery of claim 3,
   wherein the fixing groove further comprises a third fixing groove perpendicular to the first fixing groove and the second fixing groove, and a fourth fixing groove at a distance from and in parallel with the third fixing groove, and
   wherein the fixing protrusion further comprises a third fixing protrusion configured to be inserted into the third fixing groove, and a fourth fixing protrusion at a distance from and in parallel with the third fixing protrusion and configured to be inserted into the fourth fixing groove.

5. The rechargeable battery of claim 3,
wherein the cap plate further comprises a rotation-preventing groove formed with a gap from the fixing groove, and
wherein the insulation case further comprises a rotation-preventing protrusion configured to be coupled to the rotation-preventing groove.

6. The rechargeable battery of claim 5,
wherein the rotation-preventing groove comprises a first rotation-preventing groove and a second rotation-preventing groove at a distance from the first rotation-preventing groove, and
wherein the rotation-preventing protrusion comprises a first rotation-preventing protrusion configured to be coupled to the first rotation-preventing groove and a second rotation-preventing protrusion configured to be coupled to the second rotation-preventing groove.

7. The rechargeable battery of claim 1, wherein the insulation case is configured with a fixing protrusion and a plate-shape body at which the fixing protrusion is protruded and which contacts the electrode assembly.

8. The rechargeable battery of claim 7, wherein a length of the body of the insulation case is greater than a length of one side of the electrode assembly.

9. The rechargeable battery of claim 1, wherein a height of the fixing protrusion is 1.1 times a thickness of the cap plate.

\* \* \* \* \*